US012584879B2

(12) United States Patent　　(10) Patent No.: US 12,584,879 B2

Potyrailo et al.　　(45) Date of Patent: Mar. 24, 2026

(54) SYSTEMS AND METHODS FOR GAS SENSING WITH ELECTROCHEMICAL GAS SENSORS

(71) Applicant: General Electric Company, Schenectady, NY (US)

(72) Inventors: Radislav Alexandrovich Potyrailo, Niskayuna, NY (US); Baokai Cheng, Niskayuna, NY (US); Janell Marie Crowder, Clifton Park, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 930 days.

(21) Appl. No.: 17/859,921

(22) Filed: Jul. 7, 2022

(65) Prior Publication Data

US 2024/0011934 A1　　Jan. 11, 2024

(51) Int. Cl.
G01N 27/404　　(2006.01)
G01N 27/413　　(2006.01)

(52) U.S. Cl.
CPC ......... *G01N 27/404* (2013.01); *G01N 27/413* (2013.01)

(58) Field of Classification Search
CPC .. G01N 27/404; G01N 27/413; G01N 27/026; G01N 33/0004; B01D 2257/406; B01D 2257/504; B01D 53/30; F24F 7/06
See application file for complete search history.

(56) References Cited

U.S. PATENT DOCUMENTS

| | | | |
|---|---|---|---|
| 3,625,756 A | 12/1971 | Taguchi | |
| 3,631,436 A | 12/1971 | Taguchi | |
| 5,120,421 A | 6/1992 | Glass et al. | |
| 5,602,324 A | 2/1997 | Yanagida et al. | |
| 10,368,146 B2 | 7/2019 | Potyrailo et al. | |
| 10,812,878 B2 | 10/2020 | Potyrailo et al. | |
| 2020/0386728 A1 | 12/2020 | Potyrailo | |

FOREIGN PATENT DOCUMENTS

WO　　2018231196 A1　　12/2018

OTHER PUBLICATIONS

International Search Report & Written Opinion for PCT Application No. PCT/US2023/026944, Mailed Sep. 11, 2023, 14 Pages.

(Continued)

*Primary Examiner* — Kathryn Elizabeth Limbaugh

(74) *Attorney, Agent, or Firm* — Fletcher Yoder, P.C.

(57) ABSTRACT

An electrochemical gas sensor for multi-gas analysis of a fluid sample includes an electrochemical gas sensing element and a data collection component. The data collection component is configured to cycle the electrochemical gas sensing element between first excitation and signal detection values and second excitation and signal detection values at a predetermined time constant, and to measure responses of the electrochemical gas sensor to the fluid sample at the first excitation and signal detection values and the second excitation and signal detection values wherein the responses of the electrochemical gas sensor to the fluid sample at the first excitation and signal detection values and the second excitation and signal detection values are indicative of identities, respective concentrations, or a combination thereof, of at least two analyte gases of the fluid sample.

18 Claims, 10 Drawing Sheets

(56)                    References Cited

OTHER PUBLICATIONS

Wan, H.; Yin, H.; Lin, L.; Zeng, X.; Mason, A. J., Miniaturized planar room temperature ionic liquid electrochemical gas sensor for rapid multiple gas pollutants monitoring, Sensors and Actuators B: Chemical 2018, 255, 638-646.

Nakagomi, S.; Fukumura, A.; Kokubun, Y.; Savage, S.; Wingbrant, H.; Andersson, M.; Lundström, I.; Löfdahl, M.; Spetz, A. L., Influence of gate bias of MISIC-FET gas sensor device on the sensing properties, Sens. Actuators, B 2005, 108, (1-2 SPEC. ISS.), 501-507.

Bur, C.; Bastuck, M.; Spetz, A. L.; Andersson, M.; Schütze, A., Selectivity enhancement of SiC-FET gas sensors by combining temperature and gate bias cycled operation using multivariate statistics, Sens. Actuators, B 2014, 193, 931-940.

Wang, Z.; Mu, X.; Guo, M.; Huang, Y.; Mason, A. J.; Zeng, X., Methane recognition and quantification by differential capacitance at the hydrophobic ionic liquid-electrified metal electrode interface, Journal of The Electrochemical Society 2013, 160, (6), B83.

Wang, Z.; Guo, M.; Mu, X.; Sen, S.; Insley, T.; Mason, A. J.; Král, P.; Zeng, X., Highly sensitive capacitive gas sensing at Ionic liquid-electrode interfaces, Analytical chemistry 2016, 88, (3), 1959-1964.

Jeong, S. Y.; Kim, J. S.; Lee, J. H., Rational Design of Semiconductor-Based Chemiresistors and their Libraries for Next-Generation Artificial Olfaction, Adv. Mater. 2020, 2002075.

Hikita, K.; Miyayama, M.; Yanagida, H., New Gas-Sensing Method for Detecting Carbon Monoxide by Use of the Complex Impedance of a CuO/ZnO Heterocontact under a do Bias Voltage, J. Am. Ceram. Soc. 1994, 77, (7), 1961-1964.

Schipani, F.; Miller, D.; Ponce, M.; Aldao, C.; Akbar, S.; Morris, P., Electrical Characterization of Semiconductor Oxide-Based Gas Sensors Using Impedance Spectroscopy: A Review, Rev. Adv. Sci. Eng. 2016, 5, 86-105.

Potyrallo, R. A.; Go, S.; Sexton, D.; Li, X.; Alkadi, N.; Kolmakov, A.; Amm, B.; St-Pierre, R.; Scherer, B.; Nayeri, M.; Wu, G.; Collazo-Davila, C.; Forman, D.; Calvert, C.; Mack, C.; Mcconnell, P., Extraordinary performance of semiconducting metal oxide gas sensors using dielectric excitation, Nat. Electron. 2020, 3, 280-289.

Torsi, L.; Dodabalapur, A.; Sabbatini, L.; Zambonin, P. G., Multiparameter gas sensors based on organic thin-film-transistors, Sens. Actuators, B 2000, 67, 312-316.

Li, H.; Mu, X.; Yang, Y.; Mason, A. J., Low power multimode electrochemical gas sensor array system for wearable health and safety monitoring, IEEE Sensors J. 2014, 14, 3391-3399.

Weimar, U.; Göpel, W., AC Measurements on Tin Oxide Sensors to Improve Selectivities and Sensitivities, Sens. Actuators B 1995, 26, 13-18.

Getino, J.; Horrillo, M. C, Gutierrez, J.; Ares, L.; Robla, J. I.; Garcia, C.; Sayago, I., Analysis of VOCs with a tin oxide sensor array, Sens. Actuators, B 1997, 43, 200-205.

Xu, Y.; Zhao, X.; Chen, Y., Zhao, W., Research on a mixed gas recognition and concentration detection algorithm based on a metal oxide semiconductor olfactory system sensor array, Sensors (Switzerland) 2018, 18, (10).

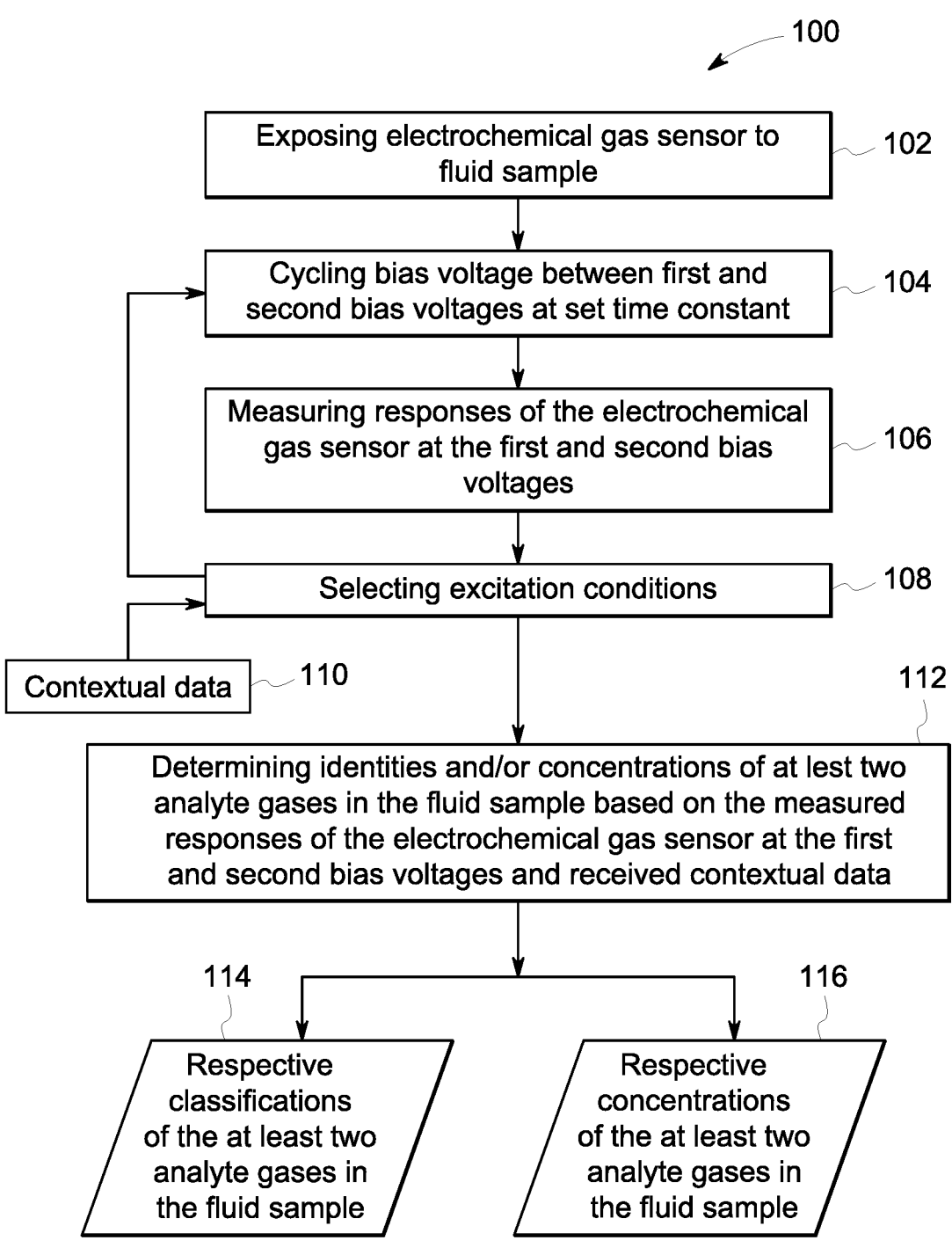

100

Exposing electrochemical gas sensor to fluid sample — 102

Cycling bias voltage between first and second bias voltages at set time constant — 104

Measuring responses of the electrochemical gas sensor at the first and second bias voltages — 106

Selecting excitation conditions — 108

Contextual data — 110

112

Determining identities and/or concentrations of at lest two analyte gases in the fluid sample based on the measured responses of the electrochemical gas sensor at the first and second bias voltages and received contextual data

114

Respective classifications of the at least two analyte gases in the fluid sample

116

Respective concentrations of the at least two analyte gases in the fluid sample

FIG. 2

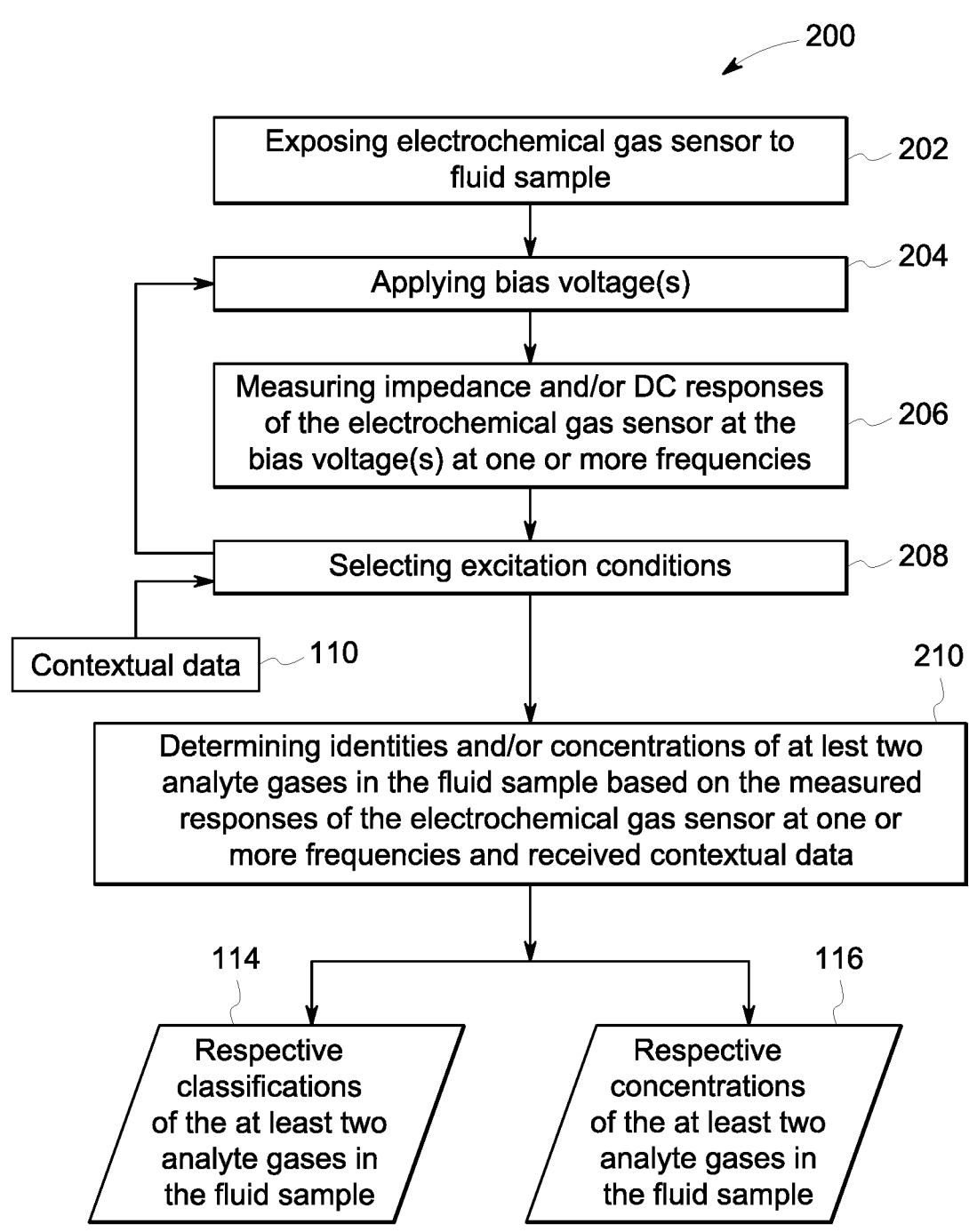

200

Exposing electrochemical gas sensor to fluid sample — 202

Applying bias voltage(s) — 204

Measuring impedance and/or DC responses of the electrochemical gas sensor at the bias voltage(s) at one or more frequencies — 206

Selecting excitation conditions — 208

Contextual data — 110

210

Determining identities and/or concentrations of at lest two analyte gases in the fluid sample based on the measured responses of the electrochemical gas sensor at one or more frequencies and received contextual data

114

Respective classifications of the at least two analyte gases in the fluid sample

116

Respective concentrations of the at least two analyte gases in the fluid sample

FIG. 3

SYSTEMS AND METHODS FOR GAS SENSING WITH ELECTROCHEMICAL GAS SENSORS

STATEMENT REGARDING FEDERALLY SPONSORED RESEARCH & DEVELOPMENT

This invention was made with U.S. Government support under Agreement No. CWMD2004 awarded by the ACC-NJ to the CWMD Consortium. The Government has certain rights in the invention.

BACKGROUND

The subject matter disclosed herein generally relates to gas sensing, and more specifically relates to gas sensing using electrochemical gas sensors.

Typically, electrochemical gas sensors are operated by applying a certain bias voltage across electrodes and measuring the resulting electrical current. The measured resulting electrical current is the single-output response of an electrochemical gas sensor. This single-output response is proportional to a concentration of one or more gases. Accordingly, traditional methods of operating electrochemical gas sensors as single-output gas sensors do not allow differentiation between different gases when the sensors respond to more than one gas. Such common response to more than one gas by the electrochemical gas sensors is known as gas cross-sensitivity and renders the single-output electrochemical gas sensors ill-suited for differentiating between multiple gases. Accordingly, it may be desirable to develop a new electrochemical gas sensor and/or new ways of operating electrochemical gas sensors to improve their ability to differentiate between multiple gases.

BRIEF DESCRIPTION

With the foregoing in mind, present embodiments are directed to systems and methods for multi-gas sensing using electrochemical gas sensors. Contrary to conventional electrochemical gas sensor designs, embodiments of the electrochemical gas sensor disclosed herein utilize techniques for cycling between bias voltages such that the bias voltage of the electrochemical gas sensor is switched (e.g., cycled or modulated) periodically before the electrical current output of the sensor reaches steady state. Such operation of the electrochemical gas sensor with periodic switching between at least two bias voltage levels provides the ability to differentiate between different gases. In some embodiments, the electrochemical gas sensor may also receive contextual data (e.g., ambient temperature, relative humidity, barometric pressure, wind speed, wind direction, location, information about surroundings, etc.), and then determine identities and/or concentrations of gases present in a fluid sample based on some combination of the response of the electrochemical gas sensor and the contextual data. The disclosed gas sensors and gas sensing methods unexpectedly provide desirable characteristics, such the ability to differentiate between multiple gases which is not available from existing electrochemical gas sensors.

For example, in an embodiment, an electrochemical gas sensor for multi-gas analysis of a fluid sample includes an electrochemical gas sensing element and a data collection component. The data collection component is configured to cycle the electrochemical gas sensing element between first excitation and signal detection values and second excitation and signal detection values at a predetermined time constant, and to measure responses of the electrochemical gas sensor to the fluid sample at the first excitation and signal detection values and the second excitation and signal detection values wherein the responses of the electrochemical gas sensor to the fluid sample at the first excitation and signal detection values and the second excitation and signal detection values are indicative of identities, respective concentrations, or a combination thereof, of at least two analyte gases of the fluid sample.

In an embodiment, a method of operating an electrochemical gas sensor includes exposing an electrochemical gas sensing element of the electrochemical gas sensor to a fluid sample, cycling, via a data collection component, the electrochemical gas sensing element between a first operational condition and a second operational condition at a pre-determined time constant, and measuring responses of the electrochemical gas sensor to the fluid sample at the first operational condition and the second operational condition, wherein the responses of the electrochemical gas sensor to the fluid sample at the first operational condition and the second operational condition are indicative of identities, respective concentrations, or a combination thereof, of at least two analyte gases of the fluid sample.

In an embodiment, an electrochemical gas sensor for multi-gas analysis of a fluid sample includes an electrochemical gas sensing element and a data collection component. The data collection component is configured to receive contextual data indicative of a humidity, a pressure, an ambient temperature, one or more wind conditions, a location, or any combination thereof, cycle the electrochemical gas sensing element between first excitation and signal detection values and second excitation and signal detection values at a predetermined time constant, and measure responses of the electrochemical gas sensor to the fluid sample at the first excitation and signal detection values and the second excitation and signal detection values. The electrochemical gas sensor is configured to determine, based on the contextual data and the responses of the electrochemical gas sensor to the fluid sample at the first excitation and signal detection values and the second excitation and signal detection values, identities, respective concentrations, or a combination thereof, of at least two analyte gases of the fluid sample.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 2 is a flow diagram illustrating an embodiment of a process whereby the gas sensor performs multi-gas analysis by cycling the electrochemical gas sensor between bias conditions, in accordance with aspects of the present technique;

FIG. 3 is a flow diagram illustrating an embodiment of a process whereby the gas sensor performs multi-gas analysis utilizing the electrochemical gas sensor via impedance detection, with or without DC measurement, at one or more bias conditions, in accordance with aspects of the present technique;

DETAILED DESCRIPTION

Present embodiments are directed to a system and a method for multi-gas sensing that utilizes an electrochemical gas sensor cycled periodically between bias voltages before the measured electrical current of the electrochemical gas sensor reaches steady state.

By selecting the bias voltages and the time constant of the cycling or switching between different bias levels, the electrochemical gas sensor may be configured to detect multiple specific gases in a fluid sample. In some embodiments, the multi-gas sensor may also be configured to receive contextual data (e.g., ambient temperature, relative humidity, barometric pressure, wind speed, wind direction, location, information about surroundings, etc.) and take the contextual data into account when processing output from the electrochemical gas sensor. Traditionally, electrochemical gas sensors utilize sufficiently large time constants of at least 5 minutes and larger to switch between different bias voltages such that the measured electrical current of the electrochemical gas sensor reaches steady state before switching bias voltages, resulting in gas sensors that are not effective at differentiating multiple detected gases in fluid samples. Thus, present embodiments unexpectedly demonstrate that cycling an electrochemical gas sensor between bias voltages before the measured electrical current of the electrochemical gas sensor reaches steady state can improve the electrochemical gas sensor's ability to identify multiple gases in a fluid sample with one sensor. As used herein, cycle time constant of sensor response is defined as the time that a sensor takes to alternate between the two bias voltages.

Figure 1:
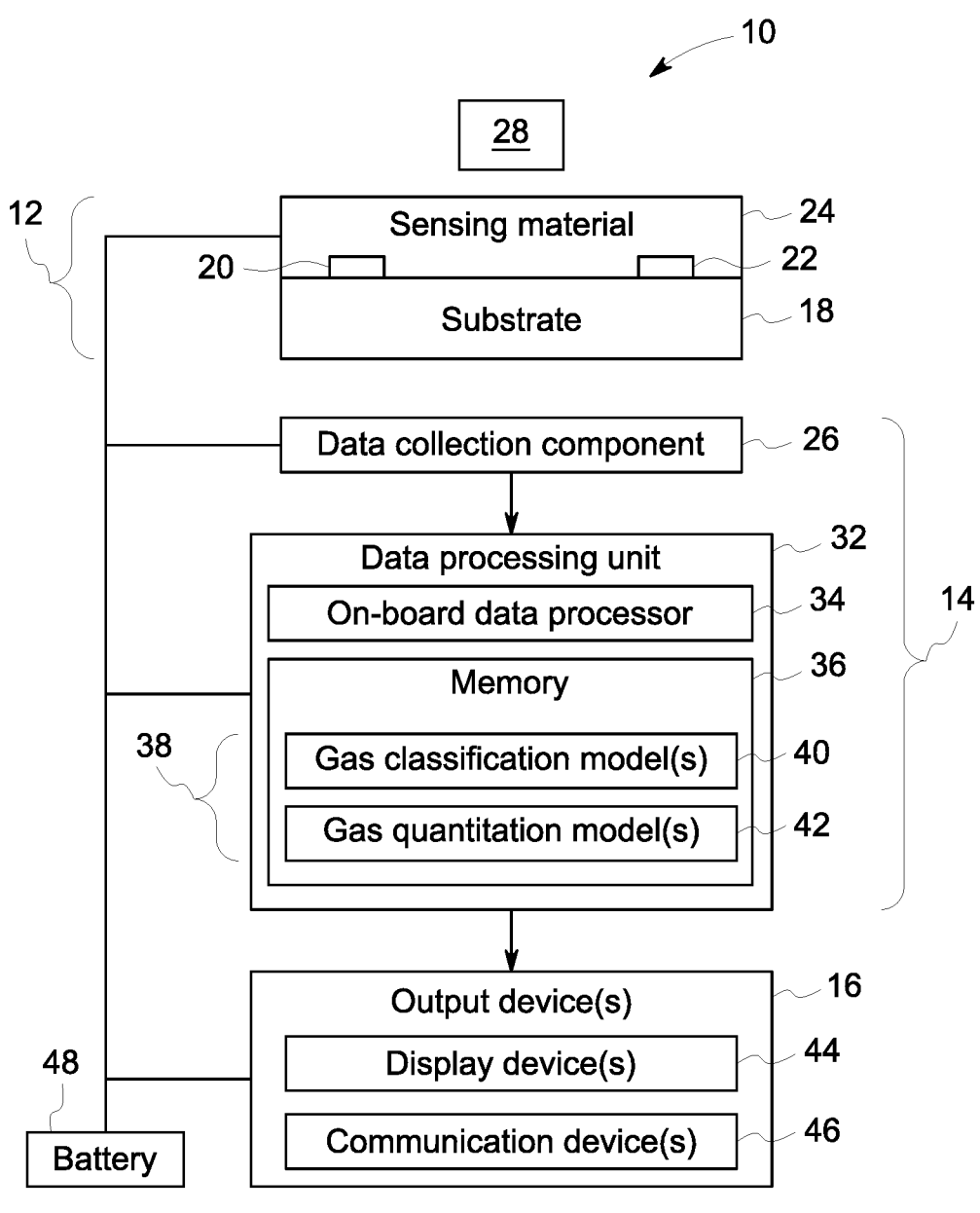
FIG. 1 is a schematic diagram of an embodiment of a gas sensor for multi-gas analysis of fluid samples that utilizes an electrochemical gas sensor, in accordance with aspects of the present technique.

The electrochemical gas sensor may be also configured to detect multiple specific gases in a fluid sample by performing measurements under direct current (DC) measurement conditions and/or under impedance measurement conditions. By analyzing responses of the same electrochemical gas sensor to the fluid sample at direct current (DC) measurement conditions and/or at the impedance measurement conditions, detected gases may be differentiated using a multivariate data analysis algorithm. In one embodiment, multi-gas differentiation may be achieved by a single electrochemical gas sensor with impedance measurements at more than one bias condition. By analyzing responses of the same electrochemical gas sensor to the fluid sample with impedance measurements at more than one bias condition, detected gases may be differentiated using a multivariate data analysis algorithm. In another embodiment, multi-gas differentiation may be achieved by a single electrochemical gas sensor with DC and impedance measurements at only one bias condition. By analyzing responses of the same electrochemical gas sensor to the fluid sample with DC and impedance measurements at only one bias condition, detected gases may be differentiated using a multivariate data analysis algorithm With the foregoing in mind, FIG. 1 is a schematic diagram of an embodiment of a gas sensor 10 for multi-gas analysis of fluid samples, in accordance with the present technique. In different embodiments, the gas sensor 10 may be a wearable multi-gas sensor, an ingestible gas sensor, a tattooed gas sensor for personal (e.g., patient) monitoring, and so forth. In certain embodiments, the gas sensor 10 may be an industrial environmental sensor, an asset monitoring sensor, an industrial process monitoring gas sensor, a consumer sensor, a transportation sensor, a security sensor, or any combination thereof. In further embodiments, the sensor may be part of a wireless sensor network.

For the embodiment illustrated in FIG. 1, the gas sensor 10 generally includes an electrochemical gas sensor 12 (or other gas sensing element), control circuitry 14, and one or more output devices 16. The electrochemical gas sensor 12 includes a substrate 18, a first electrode 20 and a second electrode 22 disposed on the substrate 18, and a gas sensing material 24 disposed on the substrate 18 between and/or over the electrodes 20, 22. A data collection component 26, which may include a bias controller and/or an impedance detector is electrically coupled to the first and second electrodes 20, 22, and may be configured to provide a bias voltage across the first and second electrodes 20, 22 during multi-gas analysis of a fluid sample 28. The impedance response and/or the direct current (DC) response of the electrochemical gas sensor 12, as measured by the data collection component 26 (e.g., via an impedance detector) when exposed the fluid sample 28 may be indicative of gases present in the fluid sample 28. For example, a transfer function, a multiplier coefficient, a lookup table, a model, etc. may be applied to data collected from the impedance response and/or the DC response of the electrochemical gas sensor 12 to identify one or more gases present in the fluid sample 28. The fluid sample 28 may include, for example, a gas, a liquid, a gas-liquid mixture, a solid material, particles or particulate matter, or the like, containing one or more gases, including analyte gases and/or interferent gases. In another embodiment, the fluid may be a gas or fuel, such as a hydrocarbon-based fuel. For example, the fluid may be natural gas or hydrogen gas that is supplied to a powered system (e.g., a manned vehicle, an unmanned vehicle, an airplane engine, or a stationary generator set) for consumption. Further, the fluid sample 28 may include gasoline, diesel fuel, jet fuel or kerosene, bio-fuels, petrodiesel-biodiesel fuel blends, natural gas (liquid or compressed), and/or fuel oils. In other embodiments, the fluid sample 28 may be a sample of indoor or outdoor ambient air. For example, the sample may be from an industrial, residential, military, construction, urban, or any other known site. Further, the ambient air sample may include relatively small concentrations of benzene, naphthalene, carbon monoxide, ozone, formaldehyde, nitrogen dioxide, sulfur dioxide, ammonia, hydrofluoric acid, hydrochloric acid, phosphine, ethylene oxide, carbon dioxide, hydrogen sulfide, chemical agents such as nerve, blister, blood, and choking agents, hydrocarbons and/or other environmental agents. In other embodiments, the fluid sample 28 may be a disinfecting agent, such as alcohol, aldehyde, chlorine dioxide, hydrogen peroxide, and so forth. In other embodiments, the fluid sample 28 may mix with ambient air from around the gas sensor 10 with relatively small concentrations, medium concentrations, and/or large concentrations of combustible gases such as methane, ethane, propane, butane, hydrogen, and/or other gases. The ambient air may have certain measurable or identifiable characteristics, such as relative humidity, temperature, barometric pressure, concentrations of other gases, etc. In further embodiments, the fluid sample 28 may include at least one gas dissolved in an industrial liquid such as transformer oil, bioprocess media, fermentation media, wastewater, and so forth. The fluid sample 28 may also include at least one gas dissolved in a consumer liquid such as milk, a non-alcoholic beverage, alcoholic beverage, cosmetics, and so forth. In other embodiments, the fluid sample 28 may include at least one gas dissolved in a body liquid such as blood, sweat, tears, saliva, urine, feces, bile, and so forth.

In certain embodiments, the fluid sample 28 may include analyte gases that are toxic industrial materials or toxic industrial chemicals. A non-limiting list of example toxic industrial materials and chemicals includes, but is not limited to, ammonia, arsine, boron trichloride, boron trifluoride, carbon disulfide, chlorine, diborane, ethylene oxide, fluorine, formaldehyde, hydrogen bromide, hydrogen chloride, hydrogen cyanide, hydrogen fluoride, hydrogen sulfide, nitric acid (fuming), phosgene, phosphorus trichloride, sulfur dioxide, sulfuric acid, and tungsten hexafluoride. In certain embodiments, the fluid sample 26 may include analyte gases that are toxic materials of the medium Hazard Index. A non-limiting list of example toxic materials of the medium Hazard Index includes, but is not limited to: acetone cyanohydrin, acrolein, acrylonitrile, allyl alcohol, allylamine, allyl chlorocarbonate, boron tribromide, carbon monoxide, carbonyl sulfide, chloroacetone, chloroacetonitrile, chlorosulfonic acid, diketene, 1,2-dimethylhydrazine, ethylene dibromide, hydrogen selenide, methanesulfonyl chloride, methyl bromide, methyl chloroformate, methyl chlorosilane, methyl hydrazine, methyl isocyanate, methyl mercaptan, nitrogen dioxide, phosphine, phosphorus oxychloride, phosphorus pentafluoride, selenium hexafluoride, silicon tetrafluoride, stibine, sulfur trioxide, sulfuryl chloride, sulfuryl fluoride, tellurium hexafluoride, n-octyl mercaptan, titanium tetrachloride, trichloroacetyl chloride, and trifluoroacetyl chloride.

In certain embodiments, the fluid sample 28 may include analyte gases that are toxic materials of the low Hazard Index. A non-limiting list of example toxic materials of the low Hazard Index includes, but is not limited to: allyl isothiocyanate, arsenic trichloride, bromine, bromine chloride, bromine pentafluoride, bromine trifluoride, carbonyl fluoride, chlorine pentafluoride, chlorine trifluoride, chloroacetaldehyde, chloroacetyl chloride, crotonaldehyde, cyanogen chloride, dimethyl sulfate, diphenylmethane-4,40-diisocyanate, ethyl chloroformate, ethyl chlorothioformate, ethyl phosphonothioic dichloride, ethyl phosphonic dichloride, ethyleneimine, hexachlorocyclopentadiene, hydrogen iodide, iron pentacarbonyl, isobutyl chloroformate, isopropyl chloroformate, isopropyl isocyanate, n-butyl chloroformate, n-butyl isocyanate, nitric oxide, n-propyl chloroformate, parathion, perchloromethyl mercaptan, sec-butyl chloroformate, tert-butyl isocyanate, tetraethyl lead, tetraethyl pyrophosphate, tetramethyl lead, toluene 2,4-diisocyanate, and toluene 2,6-diisocyanate.

In certain embodiments, the fluid sample 28 may include analyte gases that are indoor pollutants. A non-limiting list of example indoor pollutants includes, but is not limited to: acetaldehyde, formaldehyde, 1,3-butadiene, benzene, chloroform, methylene chloride, 1,4-dichlorobenzene, perchloroethylene, trichloroethylene, naphthalene, and polycyclic aromatic compounds. In certain embodiments, the fluid 26 may include analyte gases that are outdoor pollutants. A non-limiting list of example outdoor pollutants includes, but is not limited to: ozone, nitrogen dioxide, sulfur dioxide, and carbon monoxide.

In the illustrated embodiment, the first and second electrodes 20, 22 of the electrochemical gas sensor 12 are electrically coupled to the data collection component 26 of the control circuitry 14 of the gas sensor 10. In some embodiments, the data collection component 26 may be a detector designed to measure responses of the electrochemical gas sensing material 24 at one or more of the bias voltages. In certain embodiments, the data collection component 26 may be capable of measuring DC responses (e.g., electrical current responses) of the electrochemical gas sensor 12. In certain embodiments, the data collection component 26 may measure both AC and DC responses of the electrochemical gas sensor 12. Accordingly, in some embodiments, the data collection component 26 may be, or include, an impedance detector. The data collection component 26 may be configured to measure responses of the electrochemical gas sensing material 24 to exposure to the fluid sample 28 while the data collection component 26 (e.g., via a bias controller) applies one or more bias voltages across the first and second electrodes 20, 22. The responses of the electrochemical gas sensing material 24 may be indicative of a gas condition (e.g., identities and/or concentrations of gases present) of the fluid sample 28. In other embodiments, the data collection component 26 may detect multiple gases in a fluid sample by performing measurements at DC measurement conditions and/or impedance measurement conditions. By analyzing responses of the electrochemical gas sensor 12 to the fluid sample 28 at the DC measurement conditions and at the impedance measurement conditions, the electrochemical gas sensor 12 may be able to differentiate gases in the fluid sample 28, for example by using a multivariate data analysis algorithm. As used herein, the term impedance is a non-limiting term for any electrical response of the electrochemical gas sensing material 24 to exposure to the fluid sample 28 while the data collection component 26 (e.g., via a bias controller) applies one or more bias voltages across the first and second electrodes 20, 22. In some embodiments, such responses may be measured as different electrical properties. Non-limiting examples of these different electrical responses may include, for example impedance, admittance, reactance, susceptance, and the like. In the present specification, examples of the responses are given as impedances, however, other electrical responses are also envisaged.

The control circuitry 14 of the illustrated gas sensor 10 includes a data processing unit 32 (also referred to herein as data processing circuitry) that is communicatively coupled to the data collection component 26 to receive the excitation responses measured by the data collection component 26 (e.g., via an impedance detector). The data processing unit 32 may include an on-board data processor 34 and a memory 36 storing gas analysis models 38, including analyte gas classification models 40, analyte gas quantitation models 42, or any combination thereof. The gas analysis models 38 may be mathematical models that model relationships between sensor responses (e.g., responses to exposure to the fluid sample 28 while the data collection component 26 maintains one or more bias voltages between the first and second electrodes 20, 22, e.g., via a bias controller) and particular classifications or concentrations of analyte gases in the fluid sample 28. For example, the gas classification models 40 may model relationships between responses to exposure to the fluid sample 28 while the data collection component 26 maintains one or more bias voltages between the first and second electrodes 20, 22, and particular classifications of analyte gases, while the gas quantitation models 42 may model relationships between responses to exposure to the fluid sample 28 while the data collection component 26 maintains one or more bias voltages between the first and second electrodes 22, and particular concentrations of analyte gases. In other embodiments, the gas analysis models may model relationships between measured impedance at two bias conditions and/or DC measurement and impedance at one bias condition and particular classifications or concentrations of analyte gases in the fluid sample 28. In some embodiments, the gas analysis models may also take into account contextual data (e.g., ambient temperature, relative humidity, barometric pressure, wind speed, wind direction, location, information about surroundings, etc.) received from a sensor or some other source. In certain embodiments, the gas analysis models 38 may include one or more coefficients that are experimentally determined and stored in the memory 36.

As used herein, "resolving" or "differentiating" two or more analyte gases of a fluid sample, or "providing resolution" between two or more analyte gases of a fluid sample, refers to determining a respective classification for each of the analyte gases of the fluid sample, determining a respective concentration of the analyte gases of the fluid sample, or determining both respective classifications and respective concentrations of analyte gases of the fluid sample. As used herein, "classifying" or "determining a classification of" an analyte gas refers to determining an exact chemical identity (e.g., ethanol, acetone, hydrogen) of the analyte gas or determining a chemical class (e.g., a hydrocarbon, alcohol, phenol, ether, aldehyde, ketone, carboxylic acid, ester, and so forth) to which each analyte gas belongs. As used herein, an "unselected" response refers an excitation response that is measured by the data collection component 26 and is not used by the on-board data processor 34 during analysis to resolve the analyte gases of the fluid sample 28. In certain embodiments, the memory 36 may be integrated into the data processor 34. In certain embodiments, the data processor 34 may be a multicore processor. For example, in some embodiments, the on-board data processor 34 may be a multicore processor on a single integrated circuit with two or more separate processing units (or cores), each of which reads and executes program instructions. In certain embodiments, the multicore processor may only include a single central processing unit (CPU) and multiple additional cores. For embodiments in which the data processor 34 is a multicore processor, different gas analysis models 38, and/or different signal processing algorithms may be independently executed by different cores to reduce the power consumption of the data processing unit 32 and/or the gas sensor 10.

For the illustrated embodiment, the gas sensor 10 includes one or more output devices 16. In certain embodiments, the output devices 16 may include one or more display devices 44 that are configured to present information regarding a multi-gas analysis, such as the ambient condition, as well as the classification and/or concentration of two or more analyte gases of the fluid sample 28. In some embodiments, other output devices 16 (e.g., speakers, light emitting diodes (LEDs), haptic feedback devices) may be included. Accordingly, the output devices 16 may be configured to generate alarms (e.g., visual alarms, audible alarms, haptic alarms, etc.) when certain conditions are detected. In certain embodiments, the output devices 16 may include one or more communication devices 46 (e.g., wired communication interfaces, wireless communication interfaces) that enable the gas sensor 10 to communicate with other computing systems, such as a desktop computer, a mobile computing device (e.g., a laptop, smart phone), a remote server (e.g., an Internet server, a cloud server), or other sensors (e.g., gas sensors, temperature sensors, vibration sensors, health monitors) of a multi-sensor monitoring system. For example, in certain embodiments, information determined by the on-board data processor 34 regarding the resolution of two or more analyte gases in the fluid sample 28, may be provided to an external computing system that serves as a controller of a mesh of sensors that includes the gas sensor 10. In some embodiments, the gas sensor 10 may additionally or alternatively use the communication devices 46 to provide excitation response measurements to an external computing system, such that the external computing system can use these measurements to calculate one or more coefficient values for one or more of the gas analysis models and return these coefficient values to the gas sensor 10 for storage in the memory 36.

Additionally, the illustrated gas sensor 10 includes a battery 48 that is electrically coupled to provide power to various components of the gas sensor 10, including the control circuitry 14 and the output devices 16. It may be appreciated that the battery 48 may have a suitable capacity to power all of the components of the gas sensor 10. For example, this may include: providing the bias voltage between the first and second electrodes 20, 22, measuring the responses of the electrochemical gas sensing materials 24, analyzing the measured responses of exposure to the fluid sample 28 while the bias controller 26 maintains one or more bias voltages between the first and second electrodes 20, 22, and presenting results of the analysis via a suitable output devices 16. In certain embodiments, the battery 48 may have a capacity that is sufficient to operate the gas sensor 10 for at least hours. For example, the battery 48 may have a capacity ranging from 1 milliamp-hour (mAh) to 500 mAh, 1 mAh to 200 mAh, or 1 mAh to 100 mAh, or some other range. In certain embodiments, such as embodiments in which the gas sensor 10 is designed to be particularly thin (e.g., for ingestible or tattooed embodiments of the gas sensor 10), the battery 48 may have a thickness less than about 5 millimeters (mm). In some embodiments, all of the components of the gas sensor 10 may be coupled to or at least partially disposed within a suitable packaging or housing for a particular gas sensing application. For example, for personal monitoring applications, the packaging of the gas sensor 10 may be made of a biocompatible polymer that can be externally worn, subcutaneously injected, or ingested to perform personal or patient multi-gas analysis.

In some embodiments, the multi-gas sensor 10 system may be a wearable device that may be worn or otherwise moved from place to place by an operator. In such embodiments, the multi-gas sensor 10 may be positioned in or be an integrated part of a helmet, hat, glove, or other articled of clothing/equipment. For example, the multi-gas sensor 10 may be disposed within a wearable or non-wearable transferable object, such as a frame of military or industrial eyeglasses, a wearable pulse oximeter, a safety vest or harness, an article of clothing, a mobile device (e.g., a cellular phone, a tablet, or the like), or the like. The wearable device may be integrated into a piece of fabric of clothing, can be positioned on clothing, such as on a pocket, in an arm band, worn on a wrist, or other extremity, and the like. The wearable multi-gas sensor 10 can be fabricated using manufacturing technologies based on complementary metal-oxide-semiconductor electronics, flexible electronics, flexible hybrid electronics, and other approaches to provide conformal and flexible designs, implementations, and use. Optionally, the system may be a stationary device, may be independently mobile (e.g., detachable from an operator and capable of moving independent of the operator), may be airborne, and so forth.

In one or more embodiments, the multi-gas sensor 10 may be a wearable sensor system, may be held within a wearable and/or non-wearable transferrable object (e.g., a frame of military or industrial eyeglasses), or the like. The wearable multi-gas sensor 10 may be worn by a subject, such as a human or animal or a robot, may be removably coupled or integrated with an article worn by a subject (e.g., a shirt, pants, safety vest, safety personal protection clothing, eyeglasses, hat, helmet, hearing device, etc.), or may be any alternative device that may be transferrable such that multi-gas sensor 10 can be moved between different positions, may be stationary or substantially stationary, or the like.

The multi-gas sensor 10 may be in contact with the fluid sample 28 in the form of a fluid vessel that may have controlled volume or an open area, such as an indoor facility (e.g., a room, a hall, a house, a school, a hospital, a confined space, or the like), or in an outdoor facility (e.g., a stadium, a gas-production site, fueling stations, gasoline fueling stations, hydrogen fueling stations, compressed natural gas fueling stations, liquefied natural gas fueling stations, gas distribution site, fuel distribution site, a seashore, a forest, a city, urban environment, marine environment, and so forth). In some embodiments, the multi-gas sensor 10 may provide continuous monitoring of the fluid sample 28 within the reservoir or flow path. In one or more embodiments, the multi-gas sensor 10 may be an impedance gas sensor, an electromagnetic sensor, an electronic sensor, a hybrid sensor, or another type of sensor. Optionally, the multivariable gas sensor 10 may be a sensor array.

The wearable multi-gas sensor 10 may be worn, or otherwise carried, by different subjects or individuals, such as, but not limited to, soldiers, medical professionals, athletes, system operators, students, otherwise active or inactive individuals, or the like. Optionally, the wearable multi-gas sensor 10 may be coupled with, integrated with, disposed on, or the like, an asset, such as a moving system such as a drone, a stationary system, or the like. The wearable multi-gas sensor 10 may be positioned on items worn by the subject, such as helmets, pockets (e.g., of shirts, pants, bags, or the like), gloves, arm bands, ear pieces, or the like, or may be attached or otherwise coupled directly to the subject or asset, such as on the wrist, around an ankle, or the like.

FIG. 2 is a flow diagram illustrating an embodiment of a process 100 whereby the gas sensor 10 performs multi-gas analysis of a fluid sample 28. The process 100 begins with exposing the electrochemical gas sensing material 24 (block 102) of the gas sensor to a fluid sample 28 having at least two gases, including one or more analyte gases and/or one or more interferent gases. For example, the entire gas sensor 10, or only the electrochemical gas sensing material 24 of the gas sensor 10, may be exposed to the fluid sample 28. At block 104, the data collection component 26 (e.g., via a bias controller) cycles between bias voltages across the first and second electrodes 20, 22 at a set time constant. For example, the time constant may be set such the bias voltage switches before the measured electrical current of the electrochemical gas sensor 12 reaches steady state. In other embodiments, the time constant may be selected such that the time constant is less than half of a second time constant associated with an expected rate of change in a concentration of one of the analyte gases. In some embodiments, the bias voltages may be set based upon characteristics of the analyte gases being measured. For example, the time constant may be between 0.01 seconds and 1 second, or any value in between. In other embodiments, the time constant may be between 1 second and 5 seconds, or anywhere in between. In further embodiments, the time constant may be between 5 second and 10,000 seconds, or anywhere in between. In the embodiments disclosed herein, the bias voltages include first and second voltages, however, embodiments are envisaged in which the bias voltages include more than two voltages. For example, the bias voltages may include 3, 4, 6, 7, 8, 9, 10, or more voltages. Further, the data collection component 26 (e.g., via a bias controller) may cycle between bias voltages according to a step function, a sine wave, a square wave, a saw tooth pattern, or some other function. At block 106, the data collection component (e.g., via an impedance detector) measures responses of the electrochemical gas sensing materials 24 to exposure to the fluid sample 28 while the data collection component 26 (e.g., via a bias controller) cycles between the bias voltages. As discussed in more detail below, the responses may be indicative of identities and/or concentrations of analyte gases within the fluid sample 28.

At block 108, the data processor 34 of the gas sensor 10 performs data analysis of the responses of the electrochemical gas sensing materials 24 to exposure to the fluid sample 28 while the data collection component 26 (e.g., via a bias controller) cycles between the bias voltages based on at least one of the stored gas analysis models 38 to determine whether baseline excitation conditions should be adjusted and, if so, selecting adjusted excitation conditions. For the electrochemical gas sensor 12, the data processor 34 may adjust the bias voltage across the first and second electrodes 20, 22, and/or the time constant at which the bias controller cycles between the bias voltages. The adjusted excitation conditions may then be communicated to the data collection component 26. In some embodiments, the data processor 34 may receive one or more pieces of contextual data 110, such as ambient temperature, humidity, pressure, other gases present, etc., and then adjust excitation conditions based on the received contextual data and/or the received response data. Accordingly, the gas sensor may be able to accommodate for various conditions that may affect the operation of the sensor, such as rain, heat, snow/cold, etc. In some embodiments, the gas sensor 10 may also be equipped with a dynamic gain controller, by which the data processor 34 may make adjustments to the gain based on the measured responses, allowing for real time adjustments to sensitivity and resolution of the sensor responses to the environment. In embodiments in which the data processor 34 makes adjustments to the excitation conditions of the electrochemical gas sensor 12, new data may be collected at the new excitation conditions and analyzed. In some cases, the gas sensor 10 may go through multiple iterations of excitations conditions before settling on a suitable combination of excitation conditions.

Once the excitation conditions are determined by the data processor 34 to be acceptable, at block 112, the data processor 34 performs data analysis of the responses of the electrochemical gas sensing materials 24 to exposure to the fluid sample 28 while the data collection component 26 (e.g., via a bias controller) cycles between the bias voltages based on at least one of the stored gas analysis models 38 to provide a real-time resolution of the analyte gases of the fluid sample 28. That is, at block 112, the system may output respective classifications of two or more analyte gases within the fluid sample 114 and/or respective concentrations of two or more analyte gases within the fluid sample 116. In this context, "real-time" refers to the on-board data processor 34 of the gas sensor 10 being able to locally, rapidly resolve analyte gases of the fluid sample without requiring the measured excitation responses to be provided to an external computing system for processing. In some embodiments, the data processing unit 32 may generate or select and apply a transfer function, a multiplier coefficient, a lookup table, a model, etc. to the data collected from the response of the gas sensing material 24 during exposure to the fluid sample.

FIG. 3 is a flow diagram illustrating an embodiment of a process 200 whereby the gas sensor 10 performs multi-gas analysis of a fluid sample 28. The process 200 begins with exposing the electrochemical gas sensing material 24 (block 202) of the gas sensor to a fluid sample 28 having at least two gases, including one or more analyte gases and/or one or more interferent gases. At block 204, the data collection component 26 (e.g., via a bias controller) applies one or more bias voltages across the first and second electrodes 20, 22. In some embodiments, the data collection component 26 (e.g., via a bias controller) may cycle between two bias voltages across the first and second electrodes 20, 22. In such embodiments, impedance measurements at the two bias voltages may be indicative of the at least two analyte gases in the fluid sample 28. In other embodiments, the data collection component 26 (e.g., via a bias controller) may maintain a single bias voltage across the first and second electrodes 20, 22. In such embodiments, DC and impedance measurements at the bias voltage may be indicative of the at least two analyte gases in the fluid sample 28. In some embodiments, the bias voltages may be set based upon characteristics of the analyte gases being measured. However, embodiments are envisaged in which the bias voltages include more than two voltages. For example, the bias voltages may include 3, 4, 5, 6, 7, 8, 9, 10, or more voltages and the data collection component 26 (e.g., via a bias controller) may cycle between bias voltages according to a step function, a sine wave, a square wave, a saw tooth pattern, or some other function. At block 206, the data collection component (e.g., via an impedance detector) measures impedance and/or DC responses of the electrochemical gas sensing materials 24 to exposure to the fluid sample 28 while the data collection component 26 (e.g., via a bias controller) cycles applies the bias voltage(s). As discussed in more detail below, the responses may be indicative of identities and/or concentrations of analyte gases within the fluid sample 28.

At block 208, the data processor 34 of the gas sensor 10 may perform data analysis of the responses of the electrochemical gas sensing materials 24 to exposure to the fluid sample 28 while the data collection component 26 (e.g., via a bias controller) applies the bias voltage(s) based on at least one of the stored gas analysis models 38 to determine whether baseline excitation conditions should be adjusted and, if so, selecting adjusted excitation conditions. For the electrochemical gas sensor 12, the data processor 34 may adjust the bias voltage across the first and second electrodes 20, 22, and/or the time constant at which the bias controller cycles between the bias voltages. The adjusted excitation conditions may then be communicated to the data collection component 26. In some embodiments, the data processor 34 may receive one or more pieces of contextual data 110, such as ambient temperature, humidity, pressure, other gases present, etc., and then adjust excitation conditions based on the received contextual data and/or the received response data. Accordingly, the gas sensor may be able to accommodate for various conditions that may affect the operation of the sensor, such as rain, heat, snow/cold, etc. In some embodiments, the gas sensor 10 may also be equipped with a dynamic gain controller, by which the data processor 34 may make adjustments to the gain based on the measured responses, allowing for real time adjustments to sensitivity and resolution of the sensor responses to the environment. In embodiments in which the data processor 34 makes adjustments to the excitation conditions of the electrochemical gas sensor 12, new data may be collected at the new excitation conditions and analyzed. In some cases, the gas sensor 10 may go through multiple iterations of excitations conditions before settling on a suitable combination of excitation conditions.

Once the excitation conditions are determined by the data processor 34 to be acceptable, at block 210, the data processor 34 performs data analysis of the responses of the electrochemical gas sensing materials 24 to exposure to the fluid sample 28 while the data collection component 26 (e.g., via a bias controller) applies the bias voltage(s) based on at least one of the stored gas analysis models 38 to provide a real-time resolution of the analyte gases of the fluid sample 28. That is, at block 210, the system may output respective classifications of two or more analyte gases within the fluid sample 114 and/or respective concentrations of two or more analyte gases within the fluid sample 116. The impedance response and/or the DC response of the electrochemical gas sensor 12 when exposed the fluid sample 28 may be indicative of gases present in the fluid sample 28. For example, a transfer function, a multiplier coefficient, a lookup table, a model, etc. may be applied to data collected from the impedance response and/or the DC response of the electrochemical gas sensor 12 to identify one or more gases present in the fluid sample 28. In this context, "real-time" refers to the on-board data processor 34 of the gas sensor 10 being able to locally, rapidly resolve analyte gases of the fluid sample without requiring the measured excitation responses to be provided to an external computing system for processing. In some embodiments, the data processing unit 32 may generate or select and apply a transfer function, a multiplier coefficient, a lookup table, a model, etc. to the data collected from the response of the gas sensing material 24 during exposure to the fluid sample.

Multivariate data processing principles are applied to quantify diversity of responses of a multivariable sensor to different gases. Multivariate transfer functions may be built to quantify different gases. These built multivariate transfer functions may be implemented to quantify different gases in new measurement data from this multivariable sensor. Non-limiting examples of multivariate data processing principles include techniques for performing classification/cluster analysis and quantitation of gases. Classification/cluster analysis can be performed to determine the type of the analyte gas. Quantitation can be performed to determine the concentration of the analyte gas. Examples of classification/ cluster analysis algorithms include, but are not limited, to Principal Component Analysis (PCA), Hierarchical Cluster Analysis (HCA), Independent Component Analysis (ICA), Linear Discriminant Analysis (LDA), and Support Vector Machines (SVM) algorithm. Nonlimiting examples of methods for performing analyte quantitation to determine the concentration of a particular analyte gas include Principal Component Regression (PCR), Independent Component Regression (ICR), Nonlinear Regression Analysis (NRA), Discriminate Function Analysis (DFA), or Artificial Neural Network Analysis (ANN). In certain aspects of the inventive subject matter described herein, a classification algorithm can be followed by quantitation algorithm.

The analyte gases may include a wide range of materials and/or chemicals of various hazard indexes. Materials having a "high" hazard index may include, for example, Ammonia, Arsine, Boron trichloride, Boron trifluoride, Carbon disulfide, Chlorine, Diborane, Ethylene oxide, Fluorine, Formaldehyde, Hydrogen bromide, Hydrogen chloride, Hydrogen cyanide, Hydrogen fluoride, Hydrogen sulfide, Nitric acid, fuming, Phosgene, Phosphorus trichloride, Sulfur dioxide, Sulfuric acid, and Tungsten hexafluoride.

Materials having a "medium" hazard index may include, for example, Acetone cyanohydrin, Acrolein, Acrylonitrile, Allyl alcohol, Allylamine, Allyl chlorocarbonate, Boron tribromide, Carbon monoxide, Carbonyl sulfide, Chloroacetone, Chloroacetonitrile, Chlorosulfonic acid, Diketene, 1,2-Dimethylhydrazine, Ethylene dibromide, Hydrogen selenide, Methanesulfonyl chloride, Methyl bromide, Methyl chloroformate, Methyl chlorosilane, Methyl hydrazine, Methyl isocyanate, Methyl mercaptan, Nitrogen dioxide, Phosphine, Phosphorus oxychloride, Phosphorus pentafluoride, Selenium hexafluoride, Silicon tetrafluoride, Stibine, Sulfur trioxide, Sulfuryl chloride, Sulfuryl fluoride, Tellurium hexafluoride, n-Octyl mercaptan, Titanium tetrachloride, Trichloroacetyl chloride, and Trifluoroacetyl chloride.

Materials having a "low" hazard index may include, for example, Allyl isothiocyanate, Arsenic trichloride, Bromine, Bromine chloride, Bromine pentafluoride, Bromine trifluoride, Carbonyl fluoride, Chlorine pentafluoride, Chlorine trifluoride, Chloroacetaldehyde, Chloroacetyl chloride, Crotonaldehyde, Cyanogen chloride, Dimethyl sulfate, Diphenylmethane-4,40-diisocyanate, Ethyl chloroformate, Ethyl chlorothioformate, Ethyl phosphonothioic dichloride, Ethyl phosphonic dichloride, Ethyleneimine, Hexachlorocyclopentadiene, Hydrogen iodide, Iron pentacarbonyl, Isobutyl chloroformate, Isopropyl chloroformate, Isopropyl isocyanate, n-Butyl chloroformate, n-Butyl isocyanate, Nitric oxide, n-Propyl chloroformate, Parathion, Perchloromethyl mercaptan, sec-Butyl chloroformate, tert-Butyl isocyanate, Tetraethyl lead, Tetraethyl pyrophosphate, Tetramethyl lead, Toluene 2,4-diisocyanate, and Toluene 2,6-diisocyanate. Analyte gases may also include a range of indoor environmental agents, such as Acetaldehyde, Formaldehyde, 1,3-Butadiene, Benzene, Chloroform, Methylene chloride, 1,4-Dichlorobenzene, Perchloroethylene, Trichloroethylene, Naphthalene, Polycyclic aromatic compounds, as well as outdoor environmental agents, such as Ozone, Nitrogen dioxide, Sulfur dioxide, Carbon monoxide. Further, the analyte gases may include industrial agents, such as combustibles, confined space hazards, and so forth.

For the embodiment of the processes 100, 200 illustrated in FIGS. 2 and 3, after resolving the analyte gases of the fluid sample 28, the gas sensor 10 may use one or more output devices 16 to output the respective classifications 114 of the analyte gases of the fluid sample, the respective concentrations 116 of the analyte gases of the fluid sample, or some combination thereof. For example, one or more output devices 16 of the gas sensor may present or display the respective classifications 114, the respective concentrations 116 of the analyte gases of the fluid sample 28, or some combination thereof. In certain embodiments, the gas sensor 10 may provide the respective classifications 114, the respective concentrations 116 of the analyte gases, or some combination thereof, to an external computing system via one or more suitable communication devices 46 (e.g., a wireless communication interface) of the gas sensor 10.

To experimentally demonstrate the disclosed techniques, three types of experiments were performed. In a first type of experiment, dynamic bias modulation of a single electrochemical gas sensor, as shown and described with regard to FIG. 2, was used for multi-gas detection and differentiation of a fluid sample. In a second type of experiment, impedance detection with an electrochemical gas sensor at two bias conditions, as shown and described with regard to FIG. 3, was used for multi-gas detection and differentiation of a fluid sample. In a third type of experiment DC and impedance detection with an electrochemical gas sensor at one bias condition, as shown and described with regard to FIG. 3, was used for multi-gas detection and differentiation of a fluid sample.

Figure 4:
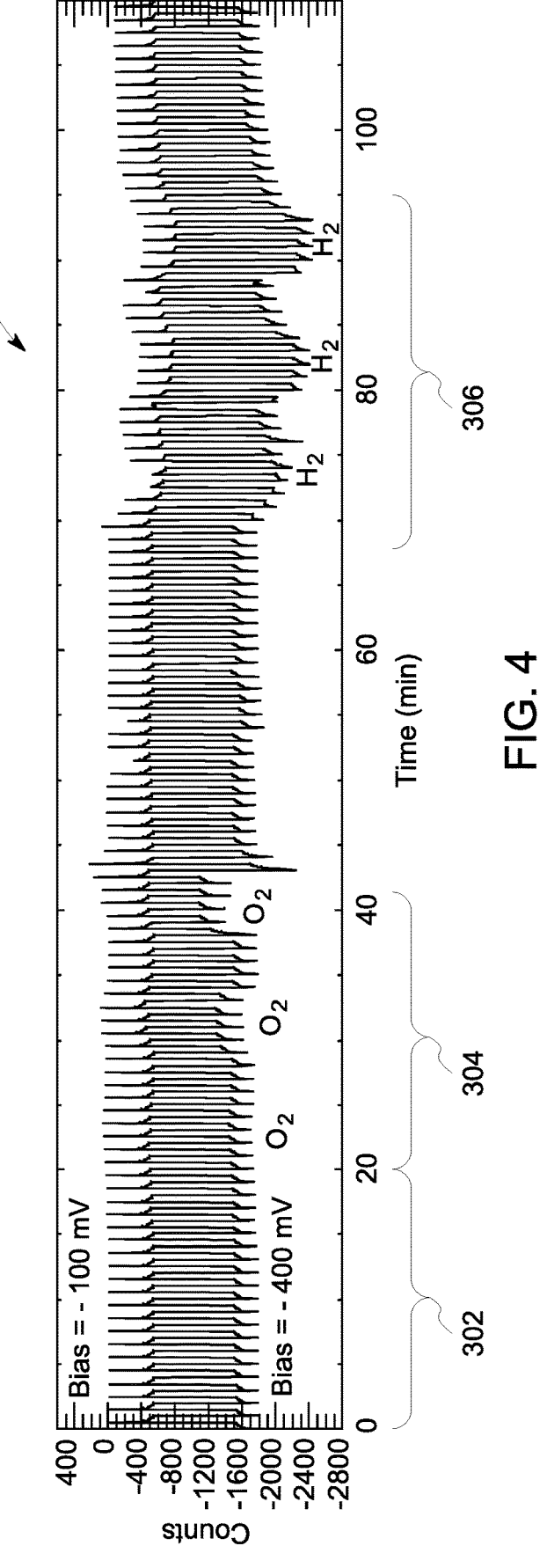
FIG. 4 is a plot depicting collected experimental data as the electrochemical gas sensor was cycled between bias voltages at a set time constant while the electrochemical gas sensor was exposed to fluid samples, in accordance with aspects of the present technique.

In the first type of experiment performed, an electrochemical gas sensor was cycled between two bias voltages at a set time constant while the sensor was exposed to various test gases. FIG. 4 is a plot 300 of collected experimental data as the electrochemical gas sensor 12 was cycled between bias voltages at a set time constant while the sensor was exposed to fluid samples 28 having various concentrations of test gases, as well as a control fluid sample. For these experiments, the control fluid sample was a sample of clean humidified air without the tested gases present. The horizontal axis represents time in minutes. The vertical axis represents response amplitude (e.g., detector counts proportional to the electrical current output from the sensor). As shown, the electrochemical gas sensor 12 was cycled between a first bias voltage of −400 mV and a second bias voltage of −100 mV at a time constant such that the electrochemical gas sensor 12 alternates between the two bias voltages every 30 seconds. During a first period of time 302, the bias controller 26 cycled the electrochemical gas sensor 12 between the bias voltages at the set time constant while the electrochemical gas sensor 12 was exposed to clean humidified air as a control. During a second period of time 304, the bias controller 26 cycled the electrochemical gas sensor 12 between the bias voltages at the set time constant while the electrochemical gas sensor 12 was exposed to fluid samples having decreasing concentrations of oxygen gas ($O_2$): 15%, 10%, and 5%. During a third period of time 306, the bias controller 26 cycled the electrochemical gas sensor 12 between the bias voltages at the set time constant while the electrochemical gas sensor 12 was exposed to fluid samples having increasing concentrations of hydrogen gas ($H_2$): 0.3%, 0.6%, and 0.9%. As shown, the response of the electrochemical gas sensor 12 to the various concentrations of $O_2$ and $H_2$ can be observed from the plot 300, even though the bias controller 26 cycles the electrochemical gas sensor 12 before it reaches steady state for each cycle.

Figure 5:
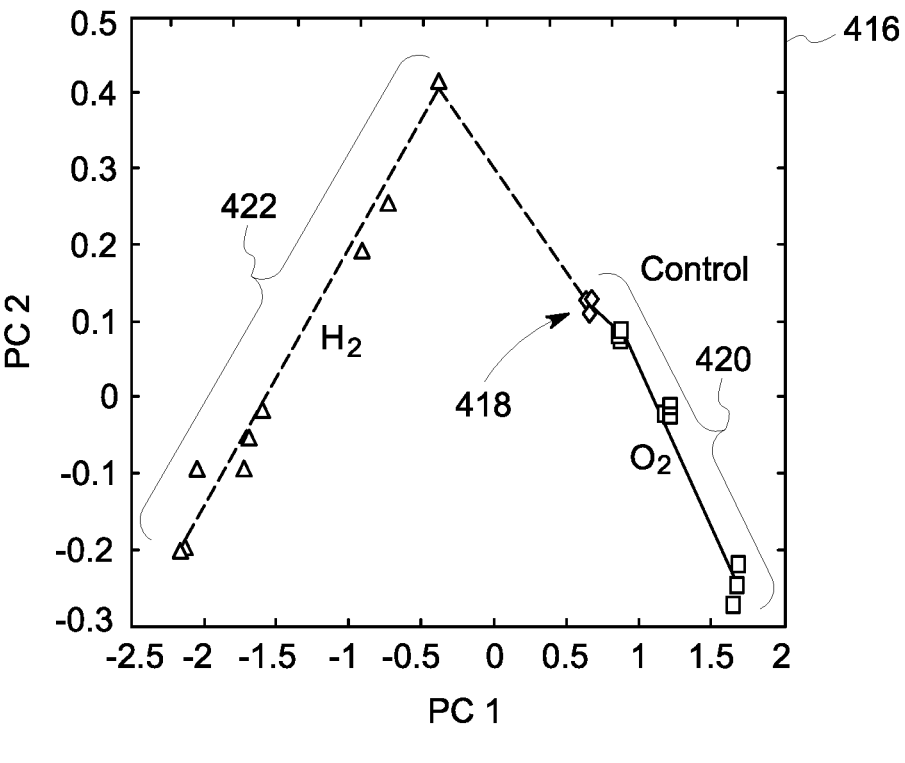
FIG. 5 is a principal components (PC) scores plot of PC1 versus PC2 for the data points collected during the test of FIG. 4, in accordance with aspects of the present technique.

Principal component analysis (PCA) was used to analyze the test data shown in FIG. 4. FIG. 5 illustrates a plot of the contributions of the sensor response to the first principal component (PC1) and the second principal component (PC2), as determined by the PCA of the test data. PCA is a robust unsupervised pattern recognition tool for classification of multivariate data. PCA reduces a multidimensional data set for its easier interpretation by calculating orthogonal principal components that are oriented in the direction of the maximum variance within the data set. The first principal component contains the highest degree of variance, and other PCs follow in the order of decreasing variance. Thus, the PCA concentrates the most significant characteristics (variance) of the data into a lower dimensional space. Responses of this single sensor at two bias levels were used to build a multivariate model using PCA tool.

As illustrated, FIG. 5 includes a plot 416 of PC1 scores on the horizontal axis against PC2 scores on the vertical axis. The plot 416 of PC1 versus PC2 depicts good differentiation between the data points for the control fluid 418, the data points of the three concentrations for $O_2$ gas (420), and the data points of the three concentrations for $H_2$ gas (422). The plot 416 of PCs visualizes the response pattern of the sensor 10 to different gases during dynamic modulation of the sensor at two bias levels. As shown, the plot 416 starts from the response to a control fluid sample 418 (e.g., clean humidified air) and extends in different directions dependent on the type of detected gases (e.g., $O_2$ 420 and $H_2$ 422). Thus, the distribution of data points in the PCA scores plot allows the visualization of relations between the original responses of the sensor at two bias levels to differentiation between three concentrations of two gases (e.g., $O_2$ 420 and $H_2$ 422) and the control 418.

Figure 6:
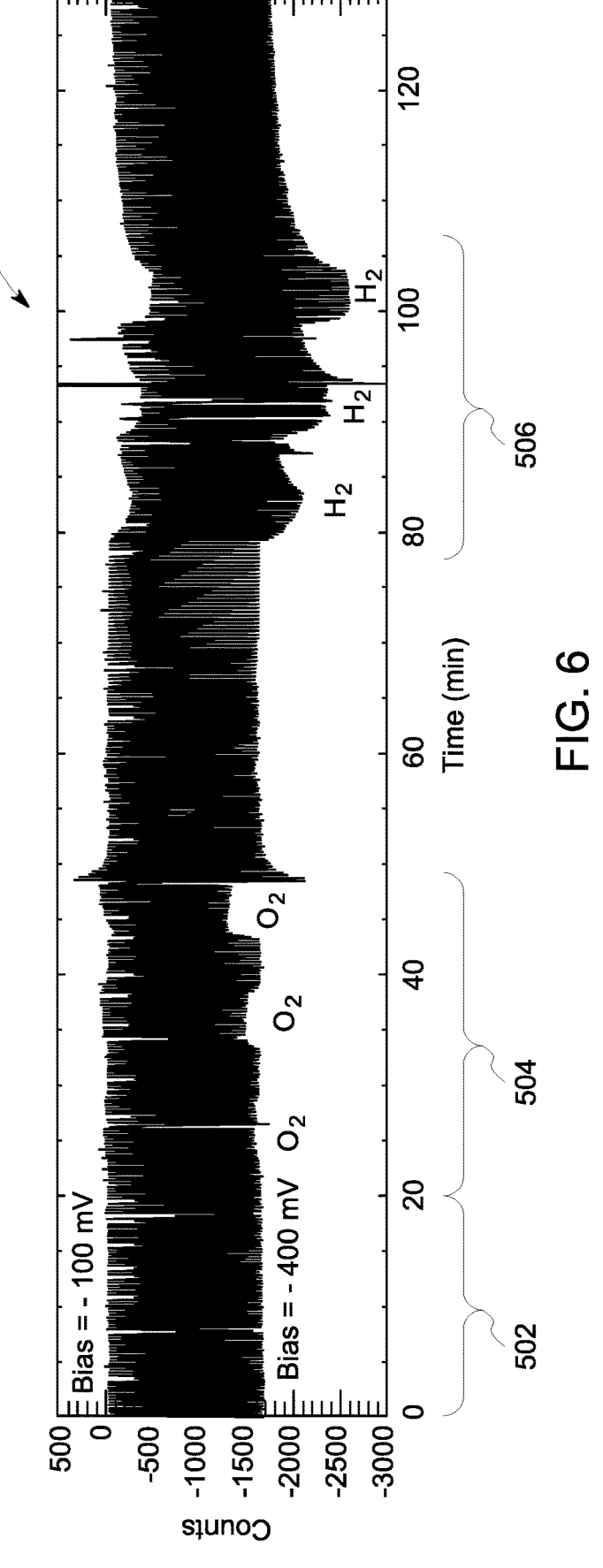
FIG. 6 is a plot depicting collected experimental data as the electrochemical gas sensor was cycled between the bias voltages at a smaller time constant than in the test of FIG. 4 while the electrochemical gas sensor was exposed to the fluid samples, in accordance with aspects of the present technique.

Another experiment was performed using the same two bias voltages (−400 mV and −100 mV), but with the time constant changed such that the bias controller alternated the electrochemical gas sensor 12 between the two bias voltages every 6 seconds while the sensor was exposed to the same test gases (a control of clean humidified air, $O_2$ gas, and Hz gas). FIG. 6 is a plot 500 of collected experimental data as the electrochemical gas sensor was cycled between the two bias voltages at a set time constant while the sensor was exposed to fluid samples having clean humidified air, $O_2$ gas, and Hz gas. The horizontal axis represents time in minutes. The vertical axis represents response amplitude. As shown, the electrochemical gas sensor 12 was cycled between the bias voltages of −400 mV and −100 mV at a time constant such that the electrochemical gas sensor 12 alternates between the two bias voltages every 6 seconds. During a first period of time 502, the bias controller 26 cycled the electrochemical gas sensor 12 between the bias voltages at the set time constant while the electrochemical gas sensor 12 was exposed to clean humidified air. During a second period of time 504, the bias controller 26 cycled the electrochemical gas sensor 12 between the bias voltages at the set time constant while the electrochemical gas sensor 12 was exposed to fluid samples having decreasing concentrations of $O_2$: 15%, 10%, and 5%. During a third period of time 506, the bias controller 26 cycled the electrochemical gas sensor 12 between the bias voltages at the set time constant while the electrochemical gas sensor 12 was exposed to fluid samples having increasing concentrations Hz: 0.3%, and 0.9%. As shown, the response of the electrochemical gas sensor 12 to the various concentrations of $O_2$ and Hz can be observed from the plot 500, even though the bias controller 26 cycles the electrochemical gas sensor 12 before it reaches steady state for each cycle.

Figure 7:
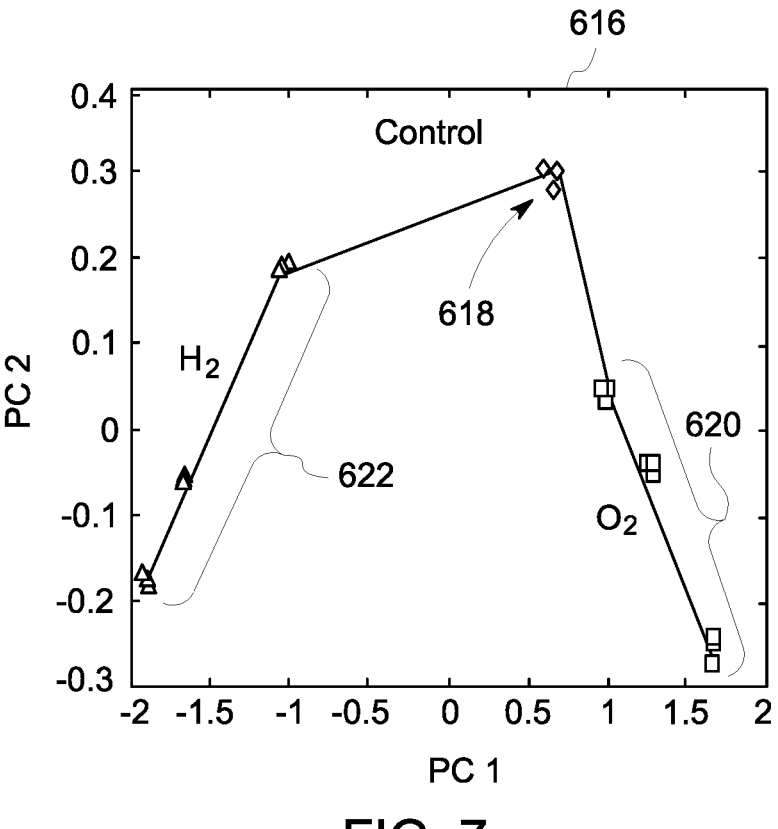
FIG. 7 is a PC scores plot of PC1 versus PC2 for the data points collected during the test of FIG. 6, in accordance with aspects of the present technique.

As with the experiment shown and described with regard to FIGS. 4 and 5, PCA was used to analyze the test data. FIG. 7 includes a plot 616 of PC1 scores on the horizontal axis against PC2 scores on the vertical axis. The plot of PC1 versus PC2 depicts good differentiation between the data points for the control fluid 618, the data points of the three concentrations for $O_2$ gas (620), and the data points of the three concentrations for Hz gas (622). Thus, similar to FIG. 5, FIG. 7 illustrates that the distribution of data points in the PCA scores plot allows the visualization of relations between the original responses of the sensor 10 at two bias levels to two gases (e.g., $O_2$ gas 620 and Hz gas 622) and the control 618 when the measurements were performed with the time constants of 30 seconds and 6 seconds while the sensor was exposed to the same test gases (a control of clean humidified air 618, $O_2$ gas 620, and $H_2$ gas 622).

Figure 8:
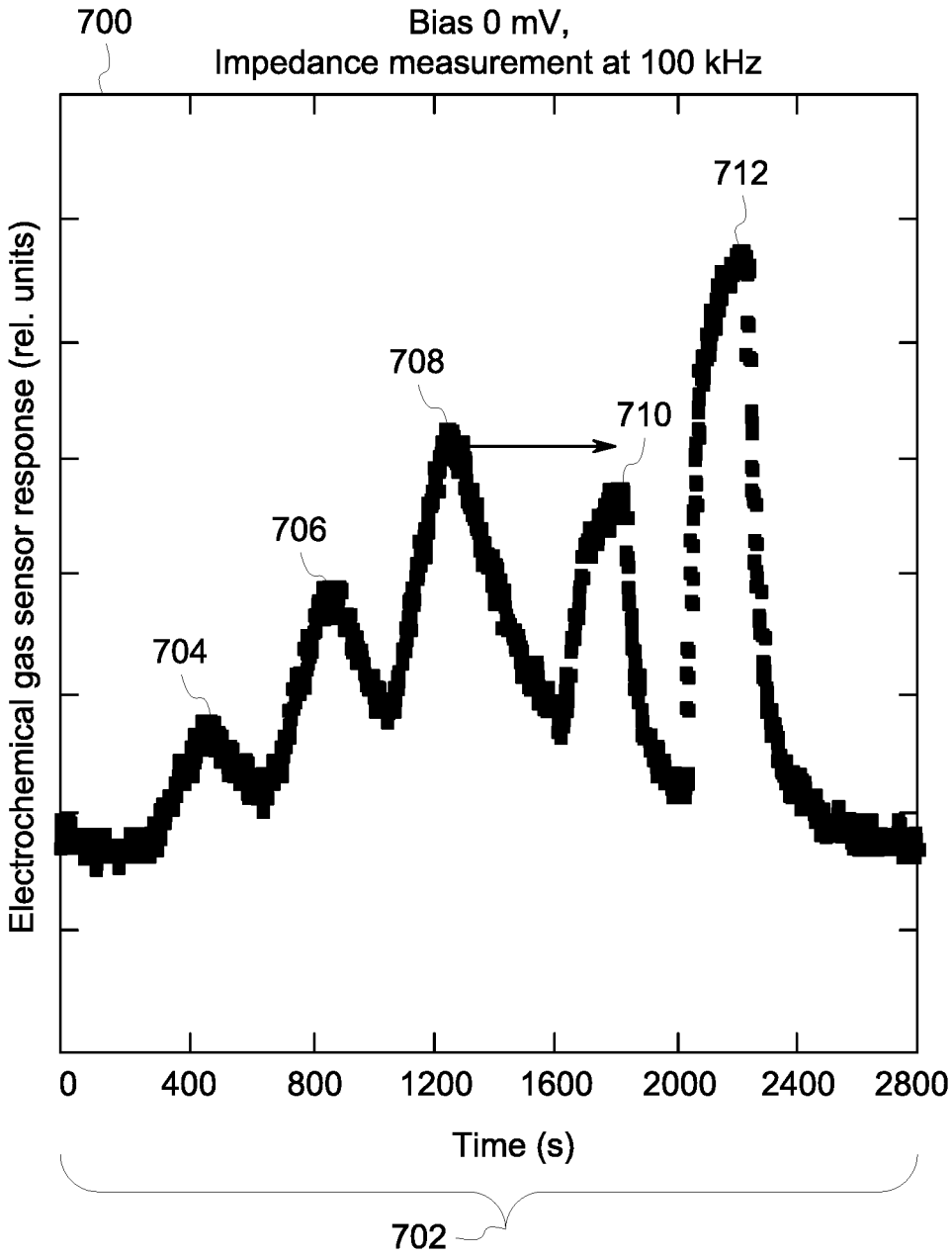
FIG. 8 is a plot of measured impedance responses of the electrochemical gas sensor to exposure to fluid samples at a bias voltage of 0 mV and a frequency of 100 kHz.

In the second type of experiment performed, impedance detection was performed with an electrochemical gas sensor 12 at two bias conditions while the sensor was exposed to various test gases. Specifically, the electrochemical gas sensor 12 was exposed to fluid samples having three increasing concentrations of ethanol (22.2 ppm, 44.4 ppm, and 66.6 ppm) and then to fluid samples having two increasing concentrations of $H_2$ (111 ppm and 222 ppm). For all of the fluid samples, the carrier gas was air having a relative humidity of about 10%. In this experiment, the bias voltages were set at 0 mV and −100 mV. For impedance measurement, the monitored frequency was 100 kHz. FIG. 8 illustrates a plot 700 of the measured impedance response of the electrochemical gas sensor 12 to exposure to the various fluid samples at a bias voltage of 0 mV and a frequency of 100 kHz. Accordingly, feature 704 indicates the measured impedance response of the electrochemical gas sensor 12 to 22.2 ppm ethanol, feature 706 indicates the measured impedance response of the electrochemical gas sensor 12 to 44.4 ppm ethanol, feature 708 indicates the measured impedance response of the electrochemical gas sensor 12 to 66.6 ppm ethanol, feature 710 indicates the measured impedance response of the electrochemical gas sensor 12 to 111 ppm Hz, and feature 712 indicates the measured impedance response of the electrochemical gas sensor 12 to 222 ppm Hz. As illustrated in FIG. 8, a clear pattern is visible in the responses to different gases at the bias voltage of 0 mV. For example, the response to the fluid sample having 66.6 ppm ethanol (708) had a larger amplitude than the response to the fluid sample having 111 ppm of Hz (710).

Figure 9:
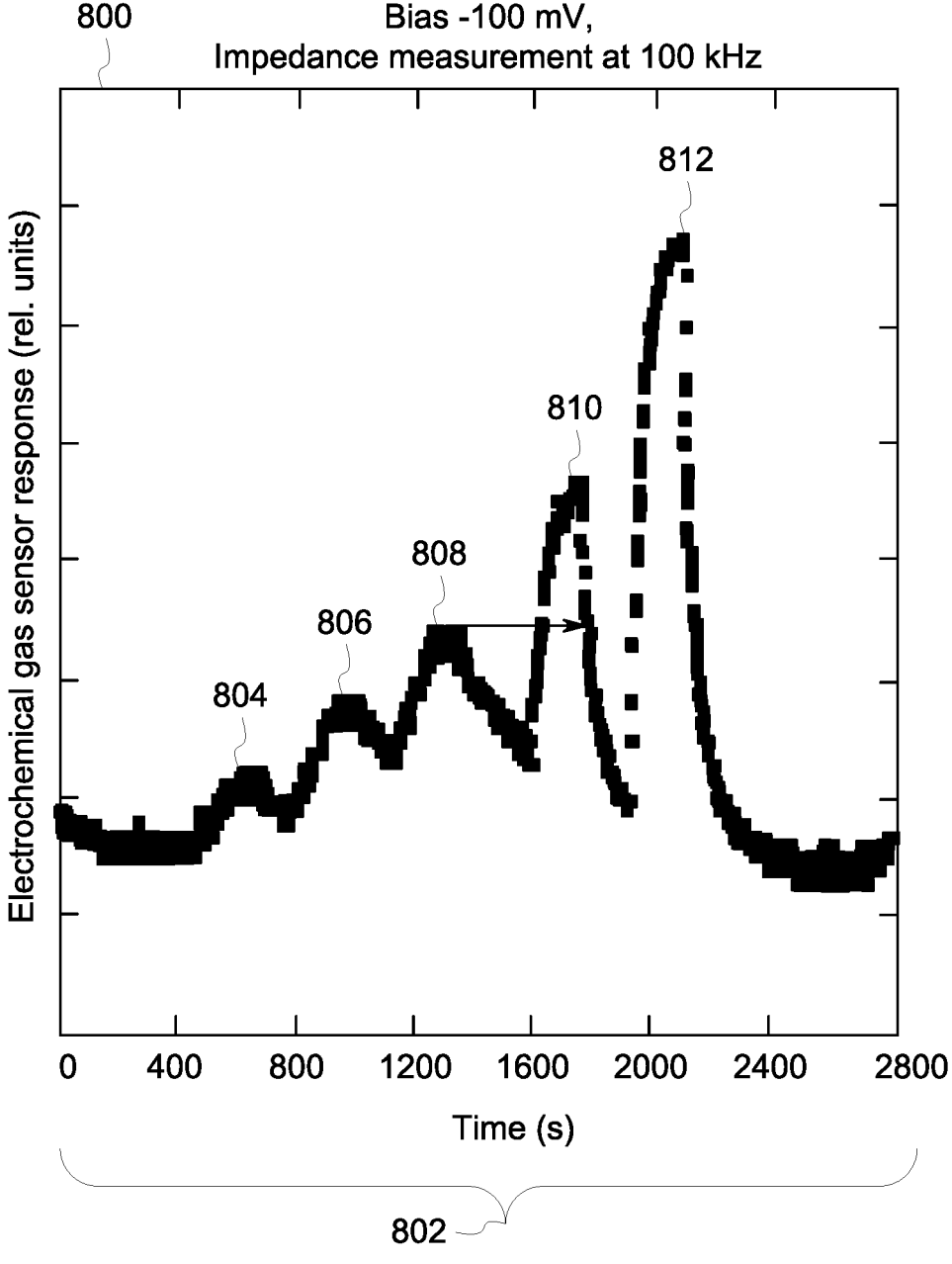
FIG. 9 is a plot of measured impedance responses of the electrochemical gas sensor to the exposure to the fluid samples at a bias voltage of −100 mV and a frequency of 100 kHz.

FIG. 9 illustrates a plot 800 of the measured impedance response of the electrochemical gas sensor 12 to exposure to the various fluid samples at a bias voltage of −100 mV and a frequency of 100 kHz. Accordingly, during a first period of time 802, feature 804 indicates the measured impedance response of the electrochemical gas sensor 12 to 22.2 ppm ethanol, feature 806 indicates the measured impedance response of the electrochemical gas sensor 12 to 44.4 ppm ethanol, feature 808 indicates the measured impedance response of the electrochemical gas sensor 12 to 66.6 ppm ethanol, feature 810 indicates the measured impedance response of the electrochemical gas sensor 12 to 111 ppm Hz, and feature 812 indicates the measured impedance response of the electrochemical gas sensor 12 to 222 ppm Hz. As with FIG. 8, a clear pattern is visible in the responses to different gases at the bias voltage of 0 mV shown in FIG. 9. For example, the response to the fluid sample having 66.6 ppm ethanol (808) had a smaller amplitude than the response to the fluid sample having 111 ppm of Hz (810).

As a result of operation of the electrochemical gas sensor at 0 mV and −100 mV bias and impedance detection at 100 kHz, there are visible differences in the responses between the two bias voltages shown in FIGS. 8 and 9. For example, at a bias voltage of mV, the response to the fluid sample having 66.6 ppm ethanol (708) had a larger amplitude than the response to the fluid sample having 111 ppm of Hz (710). However, at a bias voltage of −100 mV, the response to the fluid sample having 66.6 ppm ethanol (808) had a smaller amplitude than the response to the fluid sample having 111 ppm of Hz (810). Such differences allow for differentiation between two gases using multivariate statistical methods. Accordingly, multi-gas differentiation can be achieved by varying bias voltages and impedance detection.

Figure 10:
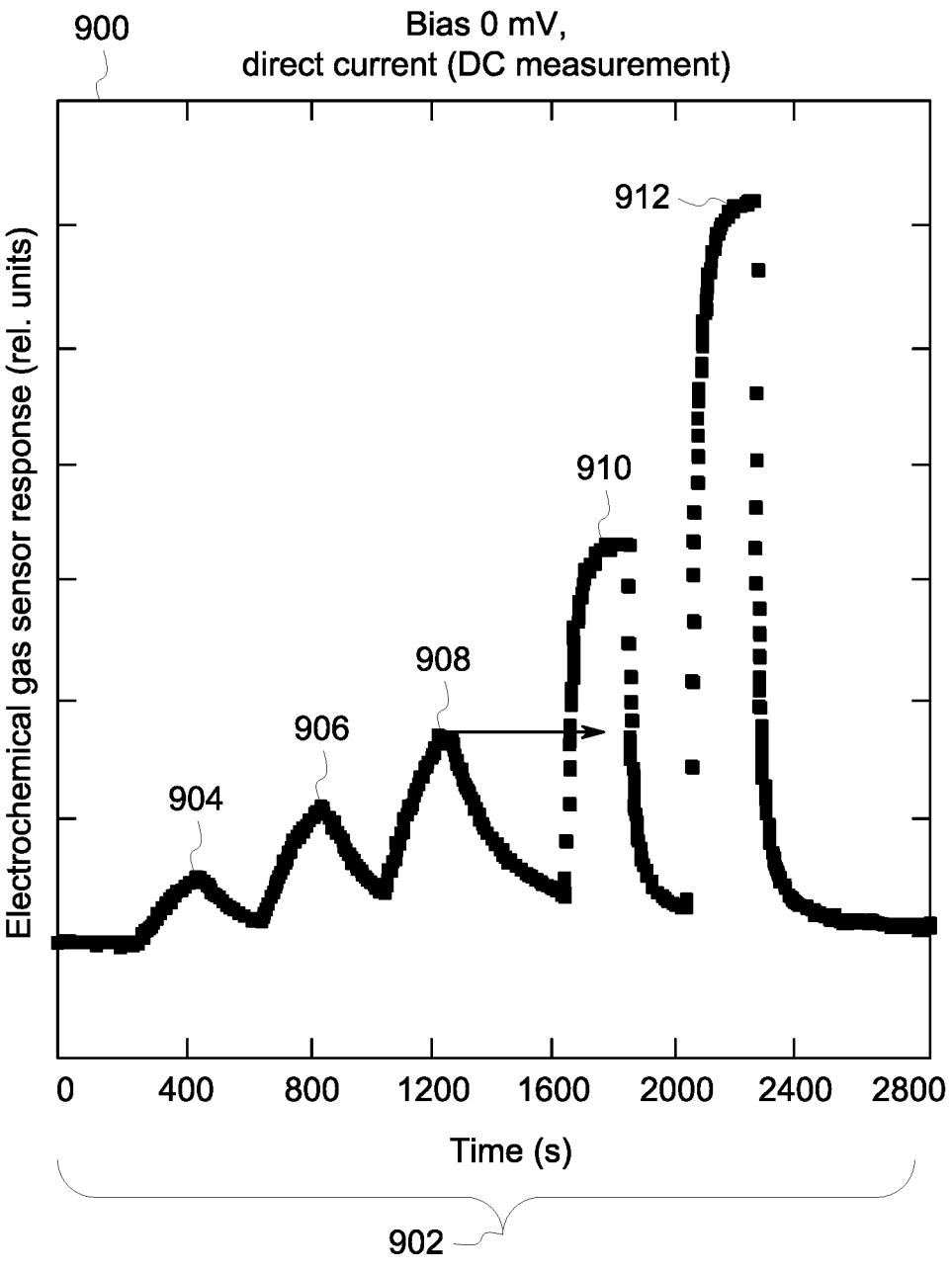
FIG. 10 is a plot of measured direct current (DC) responses of the electrochemical gas sensor to the exposure to the fluid samples at a bias voltage of 0 mV.

FIG. 10 illustrates a plot 900 of the measured DC response (measured as an electrical current) of the electrochemical gas sensor 12 to exposure to the various fluid samples at a bias voltage of 0 mV. Accordingly, during a period of time 902, feature 904 indicates the measured DC response of the electrochemical gas sensor 12 to 22.2 ppm ethanol, feature 906 indicates the measured DC response of the electrochemical gas sensor 12 to 44.4 ppm ethanol, feature 908 indicates the measured DC response of the electrochemical gas sensor 12 to 66.6 ppm ethanol, feature 910 indicates the measured DC response of the electrochemical gas sensor 12 to 111 ppm Hz, and feature 912 indicates the measured DC response of the electrochemical gas sensor 12 to 222 ppm Hz. As illustrated in FIG. 10, a clear pattern is visible in the responses to different gases at the bias voltage of 0 mV and the measured DC response measured as an electrical current. For example, the response to the fluid sample having 66.6 ppm ethanol (908) had a smaller amplitude than the response to the fluid sample having 111 ppm of Hz (910).

Comparing the plot of the impedance response at 0 mV bias shown in FIG. 8 to the DC response at 0 mV bias shown in FIG. 10, may bring some differences to light. For example, the amplitude of the DC response to 66.6 ppm ethanol (908) was less than the amplitude of the DC response to 111 ppm of Hz (910). However, the amplitude of the impedance response at 100 kHz to 66.6 ppm ethanol (708) was greater than the amplitude of the impedance response to 111 ppm of Hz (710). Such differences allow for differentiation between two gases using multivariate statistical methods. Accordingly, comparing impedance response and DC response at the same bias voltage may also help to differentiate between gases. Sensor operation with periodic switching between two bias voltages may utilize a switching circuit and provides the ability to differentiate between gases. Further, sensor operation with impedance response and DC response at the same bias voltage also provides the ability to differentiate between the same or different gases and/or achieve gas-sensing resolution and sensitivity.

Technical effects of this disclosure include multi-gas sensing with an electrochemical (E-chem) sensor cycled between bias voltages before the electrochemical gas sensor reaches steady state. By selecting bias voltages and a time constant for the electrochemical gas sensor, the electrochemical gas sensor may be configured to detect multiple specific gases in a fluid sample. In some embodiments, the multi-gas sensor may or may be configured to receive contextual data (e.g., ambient temperature, relative humidity, barometric pressure, wind speed, wind direction, location, information about surroundings, etc.) and take the contextual data into account when processing output from the electrochemical gas sensor to identify multiple gases present in a fluid sample. Traditionally, electrochemical gas sensors utilize large time constants such that the electrochemical gas sensor reaches steady state before switching bias voltages, resulting in gas sensors that are slow to react to changes in fluid samples and not very effective at sensing multiple gases in fluid samples. Thus, present embodiments unexpectedly demonstrate that cycling an electrochemical gas sensor between bias voltages before the electrochemical gas sensor reaches steady state can reduce response time to changes in fluid samples, and improve the electrochemical gas sensor's ability to identify multiple gases in a fluid sample without sacrificing the electrochemical gas sensor's accuracy. Using the disclosed techniques, an electrochemical gas sensor can be designed, manufactured, and used to resolve a plurality of gases in a fluid sample faster, more accurately, and in a wider range of conditions than was previously possible.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An electrochemical gas sensor for multi-gas analysis of a fluid sample, comprising:

an electrochemical gas sensing element; and a data collection component configured to:

cycle the electrochemical gas sensing element between a first excitation value and first signal detection values, and a second excitation value and second signal detection values at a predetermined time constant, wherein the first excitation value comprises a first bias level of the electrochemical gas sensor, and wherein the second excitation value comprises a second bias level of the electrochemical gas sensor; and measure responses of the electrochemical gas sensor to the fluid sample at the first excitation value and the first signal detection values and the second excitation value and the second signal detection values wherein the responses of the electrochemical gas sensor to the fluid sample at the first excitation value and the first signal detection values and the second excitation value and the second signal detection values are indicative of identities, respective concentrations, or a combination thereof, of at least two analyte gases of the fluid sample.

2. The electrochemical gas sensor of claim 1, wherein the first signal detection values are based on a direct current (DC) measurement, and wherein the second signal detection values are based on an impedance measurement of the electrochemical gas sensor.

3. The electrochemical gas sensor of claim 2, wherein the DC measurement and the impedance measurement of the electrochemical gas sensor are at a common bias condition.

4. The electrochemical gas sensor of claim 1, wherein the first signal detection values are based on a first impedance measurement of the electrochemical gas sensor, and wherein the second signal detection values are based on a second impedance measurement of the electrochemical gas sensor.

5. The electrochemical gas sensor of claim 4, wherein the first impedance measurement is at a first bias condition, and wherein the second impedance measurement is at a second bias condition.

6. The electrochemical gas sensor of claim 4, wherein the first impedance measurement is at a first frequency, and wherein the second impedance measurement is at a second frequency.

7. The electrochemical gas sensor of claim 6, wherein the first frequency and the second frequency are selected based on the identities of the at least two analyte gases, identities of one or more interferent gases, or a combination thereof.

8. The electrochemical gas sensor of claim 1, comprising a data processor configured to determine, based on the responses of the electrochemical gas sensor to the fluid sample at the first excitation value, the first signal detection values, the second excitation value, and the second signal detection values, the identities, the respective concentrations, or the combination thereof, of the at least two analyte gases of the fluid sample.

9. The electrochemical gas sensor of claim 1, wherein the predetermined time constant is less than half of an expected rate of change in the respective concentrations of one of the at least two analyte gases of the fluid sample.

10. The electrochemical gas sensor of claim 1, wherein the cycling between the first excitation value and the first signal detection values, and the second excitation value and the second signal detection values comprises cycling between a first bias voltage value and a second bias voltage value.

11. The electrochemical gas sensor of claim 10, wherein the cycling between a first bias voltage value and a second bias voltage value comprises following a sine wave, a square wave, a saw-tooth pattern, or any combination thereof.

12. The electrochemical gas sensor of claim 10, wherein the first bias voltage value and the second bias voltage value are selected based on the identities of the at least two analyte gases, identities of one or more interferent gases, or a combination thereof.

13. The electrochemical gas sensor of claim 1, wherein the electrochemical gas sensor is integrated into a mobile electronic device.

14. A method of operating an electrochemical gas sensor, comprising:

exposing an electrochemical gas sensing element of the electrochemical gas sensor to a fluid sample;

cycling, via a data collection component, the electrochemical gas sensing element between a first operational condition and a second operational condition at a pre-determined time constant, wherein the first operational condition corresponds to a first bias voltage value, and wherein the second operational condition corresponds to a second bias voltage value; and measuring responses of the electrochemical gas sensor to the fluid sample at the first operational condition and the second operational condition, wherein the responses of the electrochemical gas sensor to the fluid sample at the first operational condition and the second operational condition are indicative of identities, respective concentrations, or a combination thereof, of at least two analyte gases of the fluid sample.

15. The method of claim 14, wherein the first bias voltage value and the second bias voltage value are selected based on identities of the at least two analyte gases.

16. The method of claim 14, wherein the first operational condition corresponds to a first impedance measurement at a first frequency, and wherein the second operational condition corresponds to a direct current (DC) measurement or a second impedance measurement at a second frequency.

17. The method of claim 16, wherein the first frequency, or both the first and second frequencies, are selected based on the identities of the at least two analyte gases.

18. An electrochemical gas sensor for multi-gas analysis of a fluid sample, comprising:

an electrochemical gas sensing element; and a data collection component configured to:

receive contextual data indicative of a humidity, a pressure, an ambient temperature, one or more wind conditions, a location, or any combination thereof, cycle the electrochemical gas sensing element between a first excitation value and first signal detection values and a second excitation value and second signal detection values at a predetermined time constant, wherein the first excitation value comprises a first bias level of the electrochemical gas sensor, and wherein the second excitation value comprises a second bias level of the electrochemical gas sensor; and measure responses of the electrochemical gas sensor to the fluid sample at the first excitation value and the first signal detection values and the second excitation value and the second signal detection values; and wherein the electrochemical gas sensor is configured to determine, based on the contextual data and the responses of the electrochemical gas sensor to the fluid sample at the first excitation value and the first signal detection values and the second excitation value and the second signal detection values, identities, respective concentrations, or a combination thereof, of at least two analyte gases of the fluid sample.

* * * * *